(12) United States Patent
Takahashi et al.

(10) Patent No.: US 10,369,535 B2
(45) Date of Patent: Aug. 6, 2019

(54) RAPID STIRRING MACHINE

(71) Applicant: Kubota Corporation, Osaka (JP)

(72) Inventors: Koji Takahashi, Yonezawa (JP);
Takashi Tamura, Amagasaki (JP);
Ryuji Higashi, Amagasaki (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/559,957

(22) PCT Filed: Dec. 18, 2015

(86) PCT No.: PCT/JP2015/085528
§ 371 (c)(1),
(2) Date: Sep. 20, 2017

(87) PCT Pub. No.: WO2016/157645
PCT Pub. Date: Oct. 6, 2016

(65) Prior Publication Data
US 2018/0104661 A1    Apr. 19, 2018

(30) Foreign Application Priority Data
Mar. 31, 2015  (JP) .................................. 2015-070483

(51) Int. Cl.
*B01F 3/12*    (2006.01)
*B01F 7/00*    (2006.01)
(Continued)

(52) U.S. Cl.
CPC ............ *B01F 7/167* (2013.01); *B01F 3/1221* (2013.01); *B01F 7/0025* (2013.01); *B01F 7/162* (2013.01);
(Continued)

(58) Field of Classification Search
CPC ...... B01F 3/1221; B01F 7/0025; B01F 7/162; B01F 7/166; B01F 7/167; B01F 7/169;
(Continued)

(56) References Cited

U.S. PATENT DOCUMENTS 2,891,777 A * 6/1959 Gregorius ............... B01F 7/183
366/290
4,539,139 A * 9/1985 Ichikawa ............... B01F 3/0807
366/168.1
(Continued)

FOREIGN PATENT DOCUMENTS

| JP | 2002-307100 A | 10/2002 | ............. C02F 11/14 |
| JP | 2004-267880 A | 9/2004 | ............. C02F 11/14 |

(Continued)

OTHER PUBLICATIONS

International Search Report from corresponding International Patent Application No. PCT/JP2015/085528, dated Mar. 22, 2016.
Office Action issued in connection with corresponding Japan Patent Application No. 2017-509175,.dated Apr. 26, 2019 (with English translation).

*Primary Examiner* — Lucas A Stelling
(74) *Attorney, Agent, or Firm* — Kusner & Jaffe

(57) ABSTRACT

A rapid stirring machine including a tank for stirring sludge and a flocculant; a drive shaft disposed in the tank; and an edged turbine blade attached to the drive shaft, the edged turbine blade including turbine blades that are disposed along a virtual circle centered around the axis of the drive shaft, on at least one of the front and back sides of the edged turbine blade in the axial direction of the drive shaft, the turbine blades being raised in the axial direction of the drive shaft.

8 Claims, 10 Drawing Sheets

(51) Int. Cl.
  *B01F 7/16* (2006.01)
  *B01F 7/18* (2006.01)
  *B01F 7/22* (2006.01)
  *C02F 1/52* (2006.01)
  *C02F 11/12* (2019.01)
  *C02F 11/14* (2019.01)

(52) U.S. Cl.
  CPC .............. *B01F 7/166* (2013.01); *B01F 7/169* (2013.01); *B01F 7/18* (2013.01); *B01F 7/183* (2013.01); *B01F 7/22* (2013.01); *C02F 1/5281* (2013.01); *C02F 11/14* (2013.01); *B01F 2215/0052* (2013.01); *B01F 2215/0431* (2013.01); *C02F 11/12* (2013.01)

(58) Field of Classification Search
  CPC .... B01F 7/18; B01F 7/183; B01F 7/22; B01F 2215/0052; B01F 2215/0431; C02F 11/14
  See application file for complete search history.

(56) References Cited

U.S. PATENT DOCUMENTS

| | | | | |
|---|---|---|---|---|
| 2002/0043505 | A1* | 4/2002 | Olson | C02F 1/5245 210/749 |
| 2002/0130086 | A1 | 9/2002 | Miura | 210/705 |
| 2005/0283025 | A1* | 12/2005 | Hirota | B01F 3/04531 564/478 |
| 2010/0261229 | A1* | 10/2010 | Lau | B01F 3/0807 435/91.2 |

FOREIGN PATENT DOCUMENTS

| | | | | |
|---|---|---|---|---|
| JP | 2005-349319 A | 12/2005 | | |
| JP | 2008-168215 A | 7/2008 | ............. | C02F 11/14 |
| JP | 4761216 B2 | 6/2011 | ............. | C02F 11/14 |
| JP | 2012-179579 A | 9/2012 | ............. | B01D 21/01 |

* cited by examiner

FIG. 3

OUTLINE OF RAPID STIRRING MACHINE

| TYPE | TANK DIAMETER D1 mm | ROTATION DIAMETER d1 φmm | d1/D2 |
|---|---|---|---|
| FIRST EXAMPLE | 155.2 | 137 | 0.88 |
| SECOND EXAMPLE | 259.4 | 230 | 0.89 |

RAPID STIRRING MACHINE

TECHNICAL FIELD

The present invention relates to a technique of flocculation and mixing in a water-treatment facility or the like and relates to a rapid stirring machine that rapidly stirs and mixes a flocculant and raw water.

BACKGROUND ART

A flocculating-mixing tank of the related art is, for example, described in Japanese Patent No. 4761216 (Patent Literature 1). In the flocculating-mixing tank, stirring blades are vertically arranged in two stages and an upward flow of slurry containing a flocculant is supplied to be stirred and mixed. The flocculating-mixing tank is divided into a lower rapid stirring unit and an upper slow stirring unit. The rapid stirring unit has a body inside diameter smaller than that of the slow stirring unit.

The rapid stirring unit has a rapid stirring blade and a drive shaft that drives the rapid stirring blade. The rapid stirring blade includes one turbine blade that has a plurality of wings radially disposed on a surface of a rotating plate with the drive shaft located at the center.

The slow stirring unit includes a slow stirring blade and a drive shaft that drives the slow stirring blade. The slow stirring blade includes a flat paddle blade.

In the rapid stirring unit, a flocculant is dispersed in water to be treated to form nucleus for flocculated flocs, and then solids in the treated water are flocculated around the nucleus to form fine floc. At this point, without rapidly and sufficiently dispersing the flocculant, fine flocs are insufficiently formed so as to inhibit the formation of flocculated flocs during a slow stir, leading to degradation of dewatering of a dewatering machine, a thickener, and the like in the subsequent steps.

SUMMARY OF INVENTION

Technical Problems

In the foregoing configuration, the rotation of the one turbine blade causes the wings to deliver fluid in massive form, degrading the dispersion of the flocculant. In order to reliably disperse the flocculant into treated water, it is necessary to obtain a sufficient residence time for the flocculant and water to be treated in the tank. The need for the residence time may increase a power loss in the liquid circulation of the flocculant and water to be treated in the tank, thereby considerably consuming power.

Moreover, the one turbine blade disposed near the tank bottom of the rapid stirring unit is rotated to fully deliver a fluid as a rapid upward flow. This may cause a short pass so as to vary the residence time of the flocculant and water to be treated in the tank, inhibiting the formation of fine flocs.

The present invention has been devised to solve the problems. An object of the present invention is to provide a rapid stirring machine that can quickly disperse a flocculant in a tank so as to reduce power consumption.

Solution to Problems

In order to solve the problems, a rapid stirring machine according to the present invention includes: a tank for stirring sludge and a flocculant; a drive shaft disposed in the tank; and a shearing stirring blade attached to the drive shaft, the shearing stirring blade including turbine blades that are disposed along a virtual circle centered around the axis of the drive shaft, on at least one of the front and back sides of the shearing stirring blade in the axial direction of the drive shaft, the turbine blades being raised in the axial direction of the drive shaft.

In the rapid stirring machine of the present invention, the turbine blades are disposed along the tangential direction of the virtual circle centered around the axis of the drive shaft.

In the rapid stirring machine of the present invention, the shearing stirring blade has a rotating plate that integrally rotates with the drive shaft, and the turbine blades are radially disposed on the outer edge of the rotating plate.

In the rapid stirring machine of the present invention, the shearing stirring blade is an edged turbine blade.

In the rapid stirring machine of the present invention, the shearing stirring blade is disposed at a predetermined distance from a tank bottom so as to have a space between the shearing stirring blade and the tank bottom.

In the rapid stirring machine of the present invention, the shearing stirring blade is located so as to face a sludge inlet port.

In the rapid stirring machine of the present invention, the ratio of d1 to D1 is at least 0.6 where d1 is the diameter of a circle circumscribing the shearing stirring blade and D1 is the inside diameter of the tank.

A flocculating-mixing apparatus of the present invention includes a slow stirring machine disposed on a rapid stirring machine such that a tank ceiling of the rapid stirring machine communicates with a tank bottom of the slow stirring machine, wherein the rapid stirring machine is one of the foregoing rapid stirring machines.

In the flocculating-mixing apparatus of the present invention, an opening allowing communication between the tank ceiling of the rapid stirring machine and the tank bottom of the slow stirring machine has a smaller diameter than the tank inside diameter of the rapid stirring tank.

In the flocculating-mixing apparatus of the present invention, the slow stirring machine includes paddle blades disposed in multiple stages, a paddle blade near the rapid stirring machine is set such that the ratio of d2 to D2 is at least 0.6 where d2 is the diameter of a circle circumscribing the paddle blade and D2 is the inside diameter of the tank, and a paddle blade of a subsequent stage is set such that the ratio of d3 to D3 is at least 0.8 where d3 is the diameter of a circle circumscribing the paddle blade and D3 is the inside diameter of the tank.

A sludge treatment system of the present invention includes: one of the foregoing flocculating-mixing apparatuses; and a dewatering machine disposed in the downstream process of the flocculating-mixing apparatus.

A sludge treatment system of the present invention includes: one of the foregoing flocculating-mixing apparatuses; and a thickener disposed in the downstream process of the flocculating-mixing apparatus.

Advantageous Effects of Invention

As described above, according to the present invention, the rotation of the drive shaft rotates the edged turbine blade in the tank so as to stir sludge and the flocculant in the tank. At this point, the flocculant supplied into the tank is retained in massive form in sludge. The turbine blades cut flocculant lumps so as to disperse the flocculant into fine particles by shearing. This rapidly generates large quantities of flocculated floc forming nucleus, that is, a nucleus for forming flocculated flocs in sludge.

Thus, in a predetermined residence time of the flocculant and sludge in the tank, solid particles are brought into contact with flocculated floc forming nucleus in sludge with a sufficient frequency, generating large quantities of fine flocs.

In the rapid stirring machine, fine and uniform flocs are stably generated and then are flocculated in the slow stirring machine. Thus, the flocs can be stably generated in a predetermined size suitable for dewatering.

BRIEF DESCRIPTION OF DRAWINGS

FIG. 3 is a table showing the specifications of rapid stirring machines used in experiments.

DESCRIPTION OF EMBODIMENTS

Figure 1:
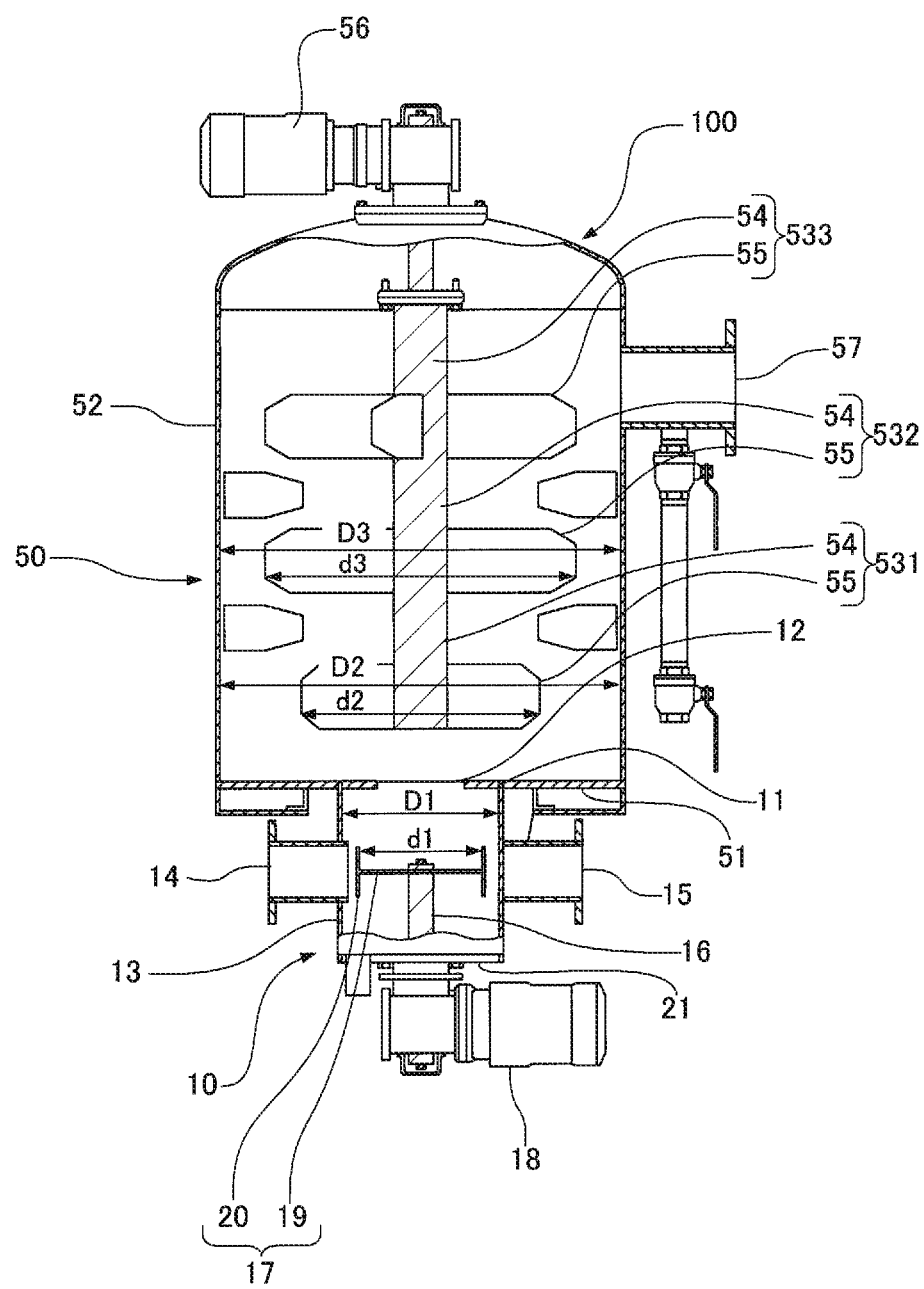
FIG. 1 is a cross-sectional view showing a flocculating-mixing apparatus according to an embodiment of the present invention.
Figure 2:
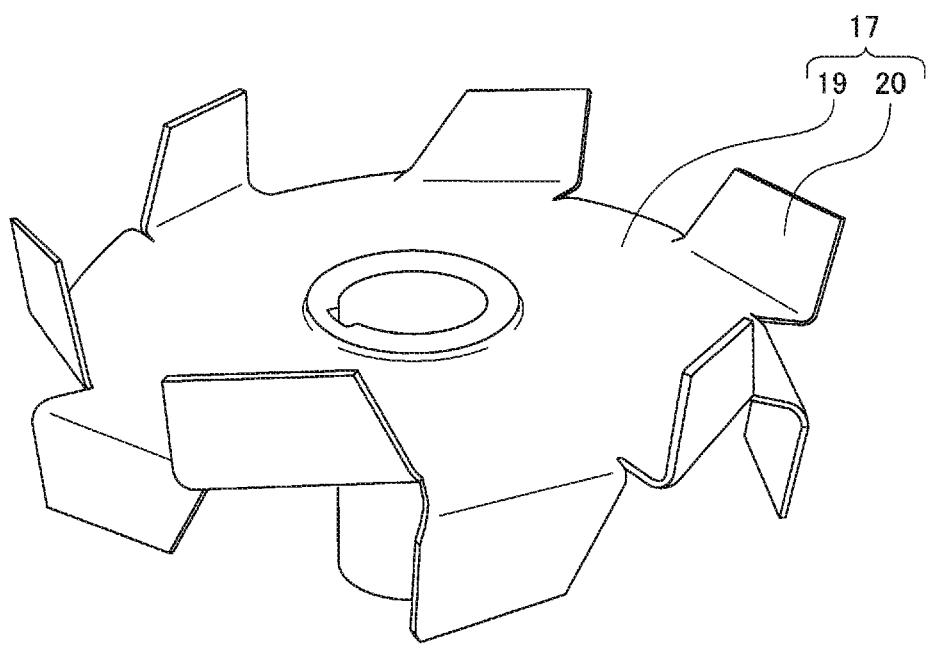
FIG. 2 is a schematic diagram showing an edged turbine blade according to the embodiment.

Embodiments of the present invention will be described below in accordance with the accompanying drawings. The present embodiment is merely exemplary and does not limit the present invention. In FIGS. 1 and 2, a flocculating-mixing apparatus 100 includes a rapid stirring machine 10 and a slow stirring machine 50. The slow stirring machine 50 is disposed on the rapid stirring machine 10. A tank ceiling 11 of the rapid stirring machine 10 and a tank bottom 51 of the slow stirring machine 50 communicate with each other at an opening 12.

The rapid stirring machine 10 includes a rapid stirring tank 13 for stirring sludge and a flocculant. The opening 12 allowing communication between the rapid stirring machine 10 and the slow stirring machine 50 has a smaller diameter than the inside diameter of the rapid stirring tank 13. The tank ceiling 11 is disposed like a annular shape around the opening 12.

In the present embodiment, sludge is a slurry material, e.g., sewage sludge and the flocculant is, for example, a polymer flocculant. The rapid stirring tank 13 is, for example, a cylinder having a diameter of about 300 mm. The rapid stirring tank 13 has a sludge inlet port 14 for supplying sludge on one side of the side wall of the rapid stirring tank 13, and a flocculant supply port 15 for supplying the flocculant on the other side of the side wall. The sludge inlet port 14 and the flocculant supply port 15 are disposed at the same level in the tank axial direction (vertical direction) of the rapid stirring tank 13.

The rapid stirring tank 13 contains a drive shaft 16 vertically extended along the axis of the tank. An edged turbine blade 17 is attached to the drive shaft 16. A motor 18 for rotating the drive shaft 16 is provided outside the bottom of the rapid stirring tank 13.

The edged turbine blade 17 has a rotating plate 19 that integrally rotates with the drive shaft 16 and a plurality of turbine blades 20 that are radially disposed on the outer edge of the rotating plate 19 so as to rise in the axial direction of the drive shaft 16. The turbine blade 20 is shaped like a wing designed for shearing. The front edge of the turbine blade 20 in the rotation direction has a sweepback angle.

In the present embodiment, the turbine blades 20 provided on the front and back sides of the rotating plate 19 in the axial direction of the drive shaft 16 may be provided only on one side of the rotating plate 19 or may be disposed on the plate surface of the rotating plate 19.

Figure 7:
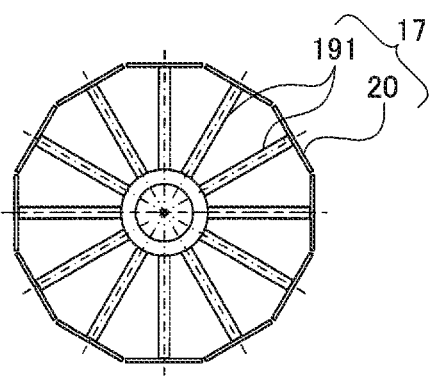
FIG. 7 is a plan view showing an edged turbine blade according to another embodiment of the present invention.
Figure 8:
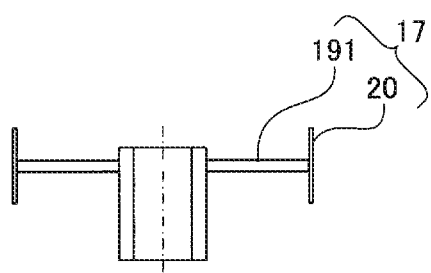
FIG. 8 is a cross-sectional view of the edged turbine blade.
Figure 9:
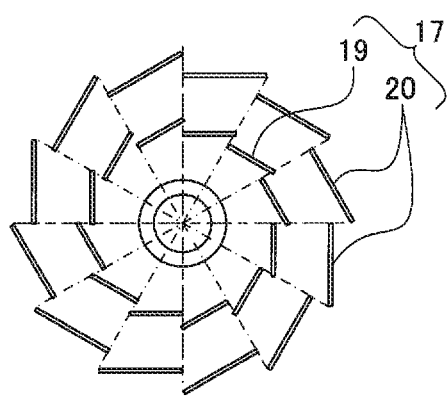
FIG. 9 is a plan view showing an edged turbine blade according to another embodiment of the present invention.
Figure 10:
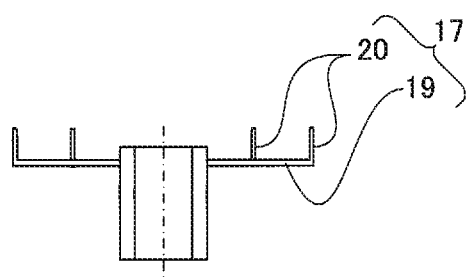
FIG. 10 is a cross-sectional view of the edged turbine blade.
Figure 11:
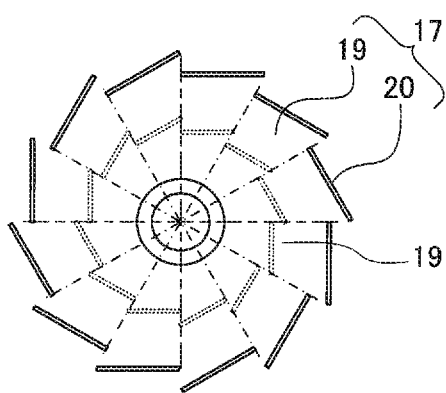
FIG. 11 is a plan view showing an edged turbine blade according to another embodiment of the present invention.
Figure 12:
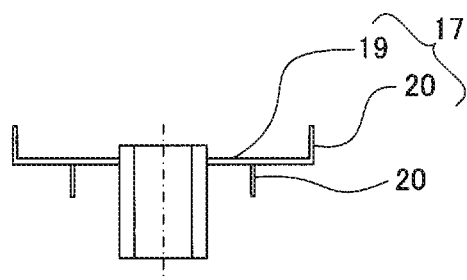
FIG. 12 is a cross-sectional view of the edged turbine blade.
Figure 13:
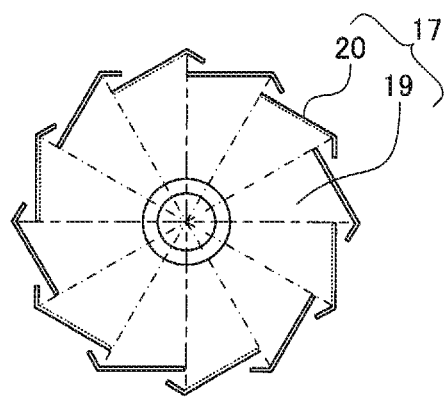
FIG. 13 is a plan view showing an edged turbine blade according to another embodiment of the present invention.
Figure 14:
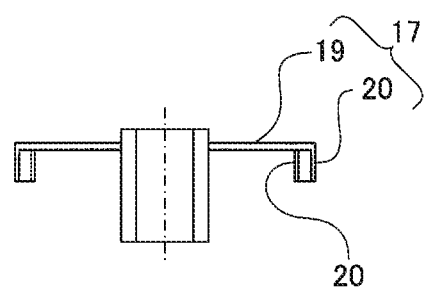
FIG. 14 is a cross-sectional view of the edged turbine blade.

For example, as shown in FIGS. 7 and 8, the turbine blades 20 may be respectively disposed on radially disposed spokes 191. As shown in FIGS. 9 and 10, the turbine blades 20 facing upward may be radially arranged like double circles on the outer edge of the rotating plate 19 and on the top surface of the rotating plate 19. As shown in FIGS. 11 and 12, the turbine blades 20 facing upward may be radially disposed on the outer edge of the rotating plate 19 and the turbine blades 20 facing downward may be disposed on the back side of the rotating plate 19. As shown in FIGS. 13 and 14, the turbine blades 20 facing downward may be radially disposed on the outer edge of the rotating plate 19 and the rear ends of the turbine blades 20 in the rotation direction may be radially bent inward.

The turbine blades 20 are disposed along a virtual circle centered around the axis of the drive shaft 16. Moreover, the turbine blades 20 are disposed along the tangential direction of the virtual circle and are designed for shearing. However, the turbine blades 20 may have a certain tilt angle relative to the tangential direction.

The position of the edged turbine blade 17 in the tank axial direction (vertical direction) of the rapid stirring tank 13 is not limited as long as the edged turbine blade 17 is disposed at a predetermined distance from the tank bottom 21 of the rapid stirring tank 13 so as to have a space between the edged turbine blade 17 and the tank bottom 21. The space is a spatial volume required for generating a swirl flow of sludge and the flocculant.

In the present embodiment, the rotating plate 19 of the edged turbine blade 17 is located so as to face the sludge inlet port 14 and the flocculant supply port 15, that is, at an intermediate position in the tank axial direction (vertical direction) of the rapid stirring tank 13.

The edged turbine blade 17 at this position can quickly shear and stir sludge and the flocculant in the rapid stirring tank 13, thereby sufficiently keep the space between the edged turbine blade 17 and the tank bottom 21.

The edged turbine blade 17 is sized under the condition that the ratio of D1 to D2 is at least 0.6, preferably 0.8 to 0.9 where D1 is the diameter of a circle circumscribing the edged turbine blade 17 and D2 is the inside diameter of the rapid stirring tank 13.

The edged turbine blade 17 configured thus can reduce a force for pressing sludge and the flocculant upward, thereby retaining sludge and the flocculant in the rapid stirring tank 13 so as to sufficiently shear and stir the sludge and the flocculant.

The slow stirring machine 50 includes a slow stirring tank 52 containing paddle blades 531, 532 and, 533 in multiple stages. Each of the paddle blades 531, 532 and, 533 includes a plurality of paddles 55 that are disposed on a drive shaft 54, which is vertically disposed along the tank axial direction of the slow stirring tank 52, so as to radially extend from an axis of the drive shaft 54.

The paddle blade 531 near the rapid stirring machine 10 is set such that the ratio of d2 to D2 is at least 0.6 where d2 is the diameter of a circle circumscribing the paddle blade 531 and D2 is the inside diameter of the tank. The paddle blade of the subsequent stage is set such that the ratio of d3 to D3 is at least 0.8 where d3 is the diameter of a circle circumscribing the paddle blade and D3 is the inside diameter of the tank.

A motor 56 for rotating the drive shaft 54 is provided outside the upper part of the slow stirring tank 52.

The upper part of the side wall of the slow stirring tank 52 has a flocculated sludge outlet port 57. In the downstream process of the flocculated sludge outlet port 57 of the flocculating-mixing apparatus 100, a dewatering machine (not shown) is disposed to constitute a sludge treatment system. The dewatering machine (not shown) may be replaced with a thickener constituting the sludge treatment system.

The effect of the configuration will be described below. Sludge is supplied into the rapid stirring tank 13 of the rapid stirring machine 10 from the sludge inlet port 14; meanwhile, the flocculant is continuously supplied from the flocculant supply port 15.

Subsequently, the drive shaft 16 is rotated by the motor 18. This rotates the edged turbine blade 17 in the rapid stirring tank 13 so as to stir and mix sludge and the flocculant.

At this point, a swirl flow of sludge and the flocculant is generated in the space between the edged turbine blade 17 and the tank bottom 21. Moreover, the opening 12 has a smaller diameter than the inside diameter of the rapid stirring tank 13 and the tank ceiling 11 is disposed like a annular shape around the opening 12, thereby generating a swirl flow of sludge and the flocculant also in a region above the edged turbine blade 17 of the rapid stirring tank 13.

Such a swirl flow can prevent a short pass from the rapid stirring tank 13 to the slow stirring tank 52, thereby obtaining a residence time for the flocculant and sludge in the tank.

The flocculant supplied into the rapid stirring tank 13 is retained in massive form in sludge. The turbine blades 20 cut flocculant lumps so as to disperse the flocculant into fine particles by shearing. This rapidly generates large quantities of flocculated floc forming nucleus, that is, a nucleus for forming flocculated floc in sludge.

Thus, in a predetermined residence time of the flocculant and sludge in the rapid stirring tank 13, solid particles are brought into contact with flocculated floc forming nucleus in sludge with a sufficient frequency, generating large quantities of fine flocs.

Moreover, the turbine blades 20 move in the flocculant in a cutting manner and generate a swirl flow of sludge in the space between the edged turbine blade 17 and the tank bottom of the rapid stirring tank 13, thereby suppressing the generation of an upward flow in the tank. Thus, a short pass is less likely to vary the residence time of sludge and the flocculant, thereby stabilizing dewatering of flocculated flocs in a dewatering machine. The turbine blades 20 rotating in sludge in a cutting manner suppress liquid circulation and reduce a power loss, leading to lower power consumption.

Sludge containing fine flocs formed in the rapid stirring tank 13 flows into the slow stirring tank 52 of the slow stirring machine 50 from the opening 12. In the slow stirring machine 50, the motor 56 rotates the drive shaft 54 so as to slowly rotate paddle blades 53 in sludge. The sludge containing fine flocs are slowly stirred and granulated by the paddle blades 53 in the first stage of the slow stirring machine 50. The granulated flocs are more strongly stirred by the paddle blades 53 in the subsequent stage than in the first stage. Excessively granulated flocs are broken and densified into flocculated flocs that are less likely to be broken with small particle diameters. This reduces the water content of a dewatered cake.

The following will discuss a comparative experiment between a rapid stirring machine including paddle blades and a rapid stirring machine including an edged turbine blade.

Figure 4:
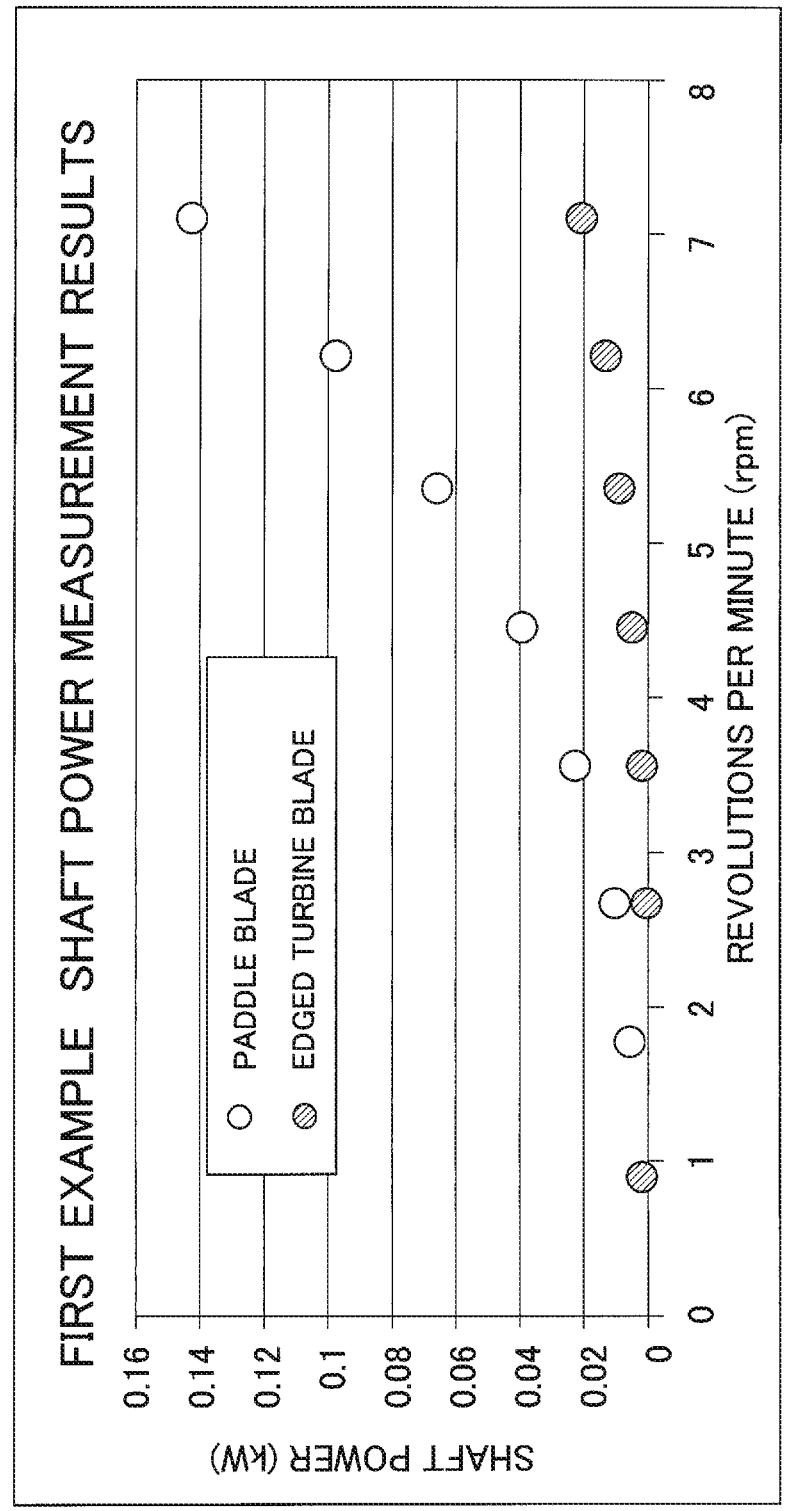
FIG. 4 is a graph showing the shaft power measurement results of a first example.
Figure 5:
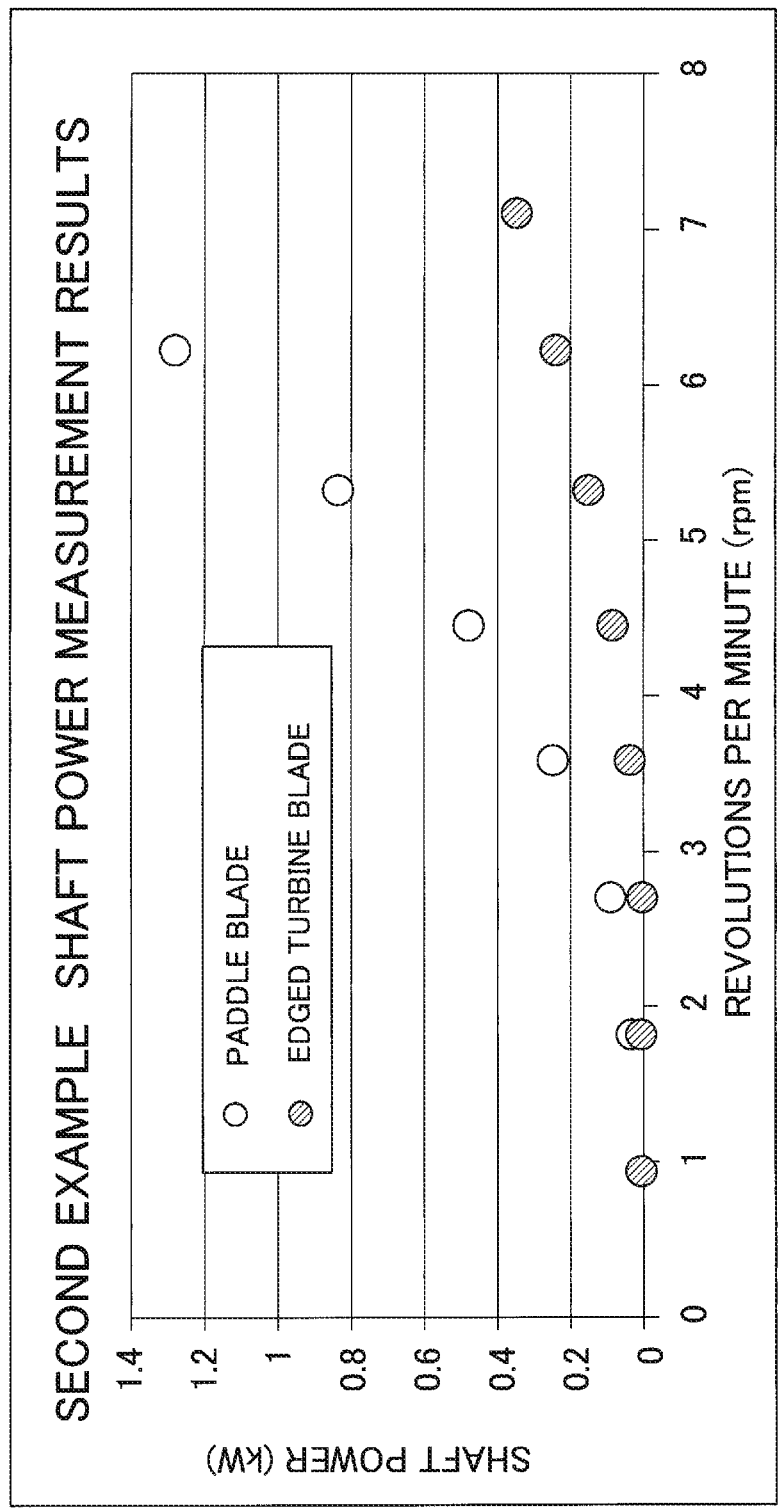
FIG. 5 is a graph showing the shaft power measurement results of a second example.
Figure 6:
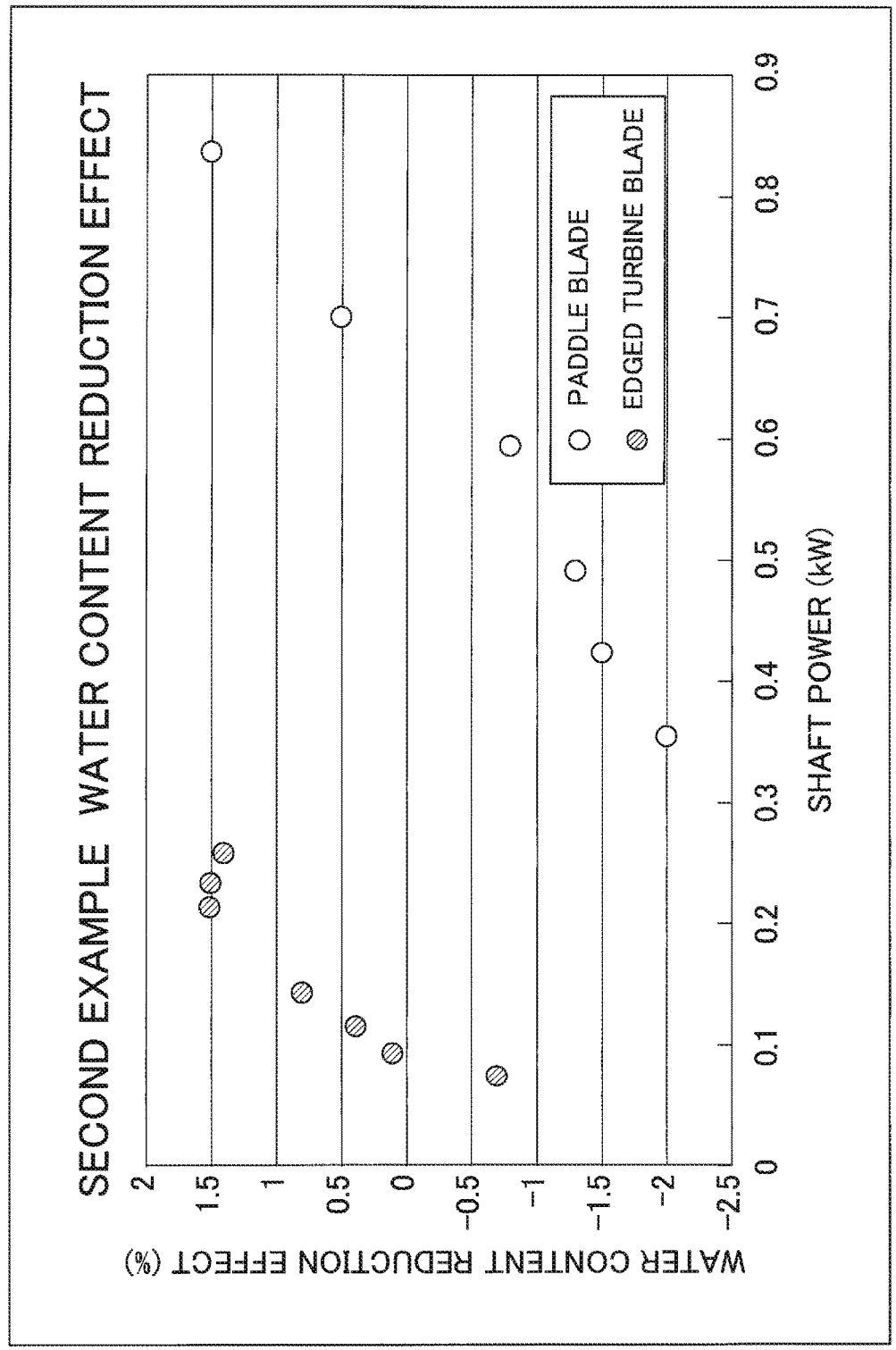
FIG. 6 is a graph showing the water content reduction results of a paddle blade and the edged turbine blade according to the second example.

FIG. 3 shows the specifications of the rapid stirring machines according to a first example and a second example. FIG. 4 is a graph showing the shaft power measurement results of the first example. FIG. 5 is a graph showing the shaft power measurement results of the second example. FIG. 6 is a graph showing the water content reduction results of the paddle blade and the edged turbine blade according to the second example.

As shown in FIG. 4, in the case of the rapid stirring machine including the paddle blades according to the first example, the shaft power is 0.143 kW at 711 rpm. In the case of the rapid stirring machine including the edged turbine blade, the shaft power is 0.0216 kW at 711 rpm. This proves that the shaft power for driving the edged turbine blade is quite smaller than that of the paddle blades of the related art.

As shown in FIG. 5, in the case of the rapid stirring machine including the paddle blades according to the second example, the shaft power is 1.273 kW at 618 rpm. In the case of the rapid stirring machine including the edged turbine blade, the shaft power is 0.3554 kW at 705 rpm. This proves that the shaft power for driving the edged turbine blade is quite smaller than that of the paddle blades of the related art.

As shown in FIG. 6, the edged turbine blade can more effectively reduce a water content with smaller shaft power as compared with the paddle blades. This proves that flocs are more properly formed using the edged turbine blade so as to reduce the water content of sludge to be dewatered in a dewatering machine, e.g., a screw press. Thus, the edged turbine blade is superior to the paddle blades in view of dewatering efficiency.

In the examples of the present embodiment, the present invention is applied to a sludge treatment system including a dewatering machine or a thickener. The present invention is applicable to a treatment system involving flocculation, for example, a flocculation system having a flocculation tank or other treatment systems.

Having described the invention, the following is claimed:

1. A flocculating-mixing apparatus comprising:
    a slow stirring machine disposed on a rapid stirring machine, the rapid stirring machine including
        a tank for stirring sludge and flocculant,
        a drive shaft disposed in the tank, and
        a shearing stirring blade attached to the drive shaft,
    wherein:
        the tank of the rapid stirring machine is a cylinder that has an inside diameter smaller than an inside diameter of a tank of the slow stirring machine, a tank ceiling of the rapid stirring machine communicates with a tank bottom of the slow stirring machine through an opening that has a smaller diameter than the inside diameter of the tank of the rapid stirring machine, the stirring blade includes a shearing stirring blade, the shearing stirring blade has a rotating plate that integrally rotates with the drive shaft and the turbine blades that are disposed on the rotating plate, the turbine blades are disposed along a virtual circle centered around an axis of the drive shaft and at a location, on the rotating plate, in a region below the annular tank ceiling, the turbine blades being raised in an axial direction of the drive shaft and having a shape of a blade facing a rotation direction of the rotating plate, and the tank of the rapid stirring machine has a sludge inlet port protruding from an inner surface of the tank of the rapid stirring machine and facing the rotating plate.

2. The flocculating-mixing apparatus according to claim 1, wherein the slow stirring machine includes paddle blades disposed in multiple stages, a paddle blade near the rapid stirring machine is set such that a ratio of d2 to D2 is at least 0.6 where d2 is a diameter of a circle circumscribing the paddle blade and D2 is an inside diameter of the tank of the slow stirring machine, and a paddle blade of a subsequent stage is set such that a ratio of d3 to D3 is at least 0.8 where d3 is a diameter of a circle circumscribing the paddle blade and D3 is an inside diameter of the tank of the slow stirring machine.

3. A sludge treatment system comprising:
the flocculating-mixing apparatus according to claim 1; and
a dewatering machine disposed in a downstream process of the flocculating-mixing apparatus.

4. A sludge treatment system comprising:
the flocculating-mixing apparatus according to claim 1; and
a thickener disposed in a downstream process of the flocculating-mixing apparatus.

5. The flocculating-mixing apparatus according to claim 1, wherein the slow stirring machine includes paddle blades disposed in multiple stages, and a diameter of a circle circumscribing the shearing stirring blade is smaller than a diameter of a circle circumscribing the paddle blade.

6. The flocculating-mixing apparatus according to claim 1, wherein the shearing stirring blade is an edged turbine blade in which the turbine blades are radially disposed on an outer edge of the rotating plate.

7. The flocculating-mixing apparatus according to claim 6, wherein the tank of the rapid stirring machine has a flocculant supply port disposed at the same level with the sludge inlet port in a tank axial direction of the tank of the rapid stirring machine, and the flocculant supply port and the sludge inlet port face the rotating plate and the turbine blades of the edged turbine blade.

8. The flocculating-mixing apparatus according to claim 7, wherein the rotating plate of the edged turbine blade is located at an intermediate position in the tank axial direction of the tank of the rapid stirring machine.

\* \* \* \* \*